United States Patent
Takanashi et al.

(10) Patent No.: US 10,892,467 B2
(45) Date of Patent: Jan. 12, 2021

(54) NONAQUEOUS ELECTROLYTE SECONDARY BATTERY

(71) Applicant: SANYO Electric Co., Ltd., Daito (JP)

(72) Inventors: Yuu Takanashi, Hyogo (JP); Masao Inoue, Tokushima (JP); Toyoki Fujihara, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 162 days.

(21) Appl. No.: 16/023,111

(22) Filed: Jun. 29, 2018

(65) Prior Publication Data

US 2019/0013508 A1    Jan. 10, 2019

(30) Foreign Application Priority Data

Jul. 5, 2017    (JP) ................................ 2017-132070

(51) Int. Cl.
| | | |
|---|---|---|
| H01M 2/34 | (2006.01) | |
| H01M 4/136 | (2010.01) | |
| H01M 4/36 | (2006.01) | |
| H01M 4/58 | (2010.01) | |
| H01M 10/0525 | (2010.01) | |
| H01M 10/058 | (2010.01) | |
| H01M 4/02 | (2006.01) | |
| C01B 15/16 | (2006.01) | |
| C01B 15/10 | (2006.01) | |

(52) U.S. Cl.
CPC ........... *H01M 2/345* (2013.01); *C01B 15/103* (2013.01); *C01B 15/16* (2013.01); *H01M 4/136* (2013.01); *H01M 4/364* (2013.01); *H01M 4/5825* (2013.01); *H01M 10/058* (2013.01); *H01M 10/0525* (2013.01); *H01M 2004/028* (2013.01); *H01M 2200/20* (2013.01); *H01M 2220/20* (2013.01); *H01M 2300/0025* (2013.01)

(58) Field of Classification Search
CPC ...... C01B 15/16; C01B 15/103; H01M 2/345; H01M 4/136; H01M 4/364; H01M 4/5825; H01M 10/0525; H01M 10/058; H01M 2004/028; H01M 2200/20; H01M 2220/20; H01M 2300/0025

See application file for complete search history.

(56) References Cited

U.S. PATENT DOCUMENTS

| | | | |
|---|---|---|---|
| 5,962,167 A | 10/1999 | Nakai et al. | |
| 2009/0181311 A1* | 7/2009 | Iwanaga | H01M 4/131 429/331 |
| 2010/0117025 A1* | 5/2010 | Takeuchi | H01M 4/131 252/182.1 |
| 2011/0133117 A1* | 6/2011 | Awano | C01G 23/005 252/182.1 |
| 2011/0177364 A1 | 7/2011 | Miyazaki et al. | |
| 2013/0029191 A1* | 1/2013 | Byun | H01M 2/024 429/61 |
| 2016/0380303 A1 | 12/2016 | Minami et al. | |

FOREIGN PATENT DOCUMENTS

| | | | |
|---|---|---|---|
| JP | 10-154532 A | | 6/1998 |
| JP | 2008-181830 | * | 8/2008 |
| JP | 2011-150873 A | | 8/2011 |
| JP | 2017-10819 A | | 1/2017 |

OTHER PUBLICATIONS

Lithium Phosphate, LTS Research Laboratories, Inc., 2015 (Year: 2015).*
Lithium carbonate, PubChem, date unknown.*
Machine translation of JP 2008-181830, published on Aug. 7, 2008 (Year: 2008).*

* cited by examiner

*Primary Examiner* — Anca Eoff
(74) *Attorney, Agent, or Firm* — Westerman, Hattori, Daniels & Adrian, LLP

(57) ABSTRACT

A nonaqueous electrolyte secondary battery includes an electrode assembly including a negative plate and a positive plate including a positive electrode active material mix layer, a nonaqueous electrolyte, a battery case that houses the electrode assembly and the nonaqueous electrolyte, and a pressure-sensitive safety system that operates when the pressure in the battery case reaches a value greater than or equal to a predetermined value. The positive electrode active material mix layer contains lithium carbonate and lithium phosphate. The average particle size of lithium carbonate contained in the positive electrode active material mix layer is greater than the average particle size of lithium phosphate contained in the positive electrode active material mix layer. The number of particles of lithium carbonate contained in the positive electrode active material mix layer is less than the number of particles of lithium phosphate contained in the positive electrode active material mix layer.

11 Claims, 4 Drawing Sheets

NONAQUEOUS ELECTROLYTE SECONDARY BATTERY

CROSS REFERENCE TO RELATED APPLICATIONS

The present invention application claims priority to Japanese Patent Application No. 2017-132070 filed in the Japan Patent Office on Jul. 5, 2017, the entire contents of which are incorporated herein by reference.

BACKGROUND OF THE INVENTION

Field of the Invention

The present invention relates to a nonaqueous electrolyte secondary battery.

Description of Related Art

In recent years, nonaqueous electrolyte secondary batteries have been used in power supplies for driving hybrid electric vehicles (PHEVs and HEVs) and electric vehicles (EVs) and the like. Needs for the enhancement of the performance and reliability of nonaqueous electrolyte secondary batteries used in such power supplies and the like are increasingly growing.

For example, a technique in which a pressure-sensitive safety system such as a current-blocking system or a short-circuiting system is attached to a nonaqueous electrolyte secondary battery has been proposed as a method for ensuring the reliability in the case where the nonaqueous electrolyte secondary battery falls into an overcharged state. The pressure-sensitive safety system operates when the nonaqueous electrolyte secondary battery falls into an overcharged state and the pressure in a battery case reaches a value greater than or equal to a predetermined value, thereby preventing the further progress of overcharge.

In a nonaqueous electrolyte secondary battery provided with a pressure-sensitive safety system, a positive electrode active material mix layer preferably contains lithium carbonate. In the case where the positive electrode active material mix layer contains lithium carbonate, lithium carbonate decomposes to generate a large amount of carbon dioxide when the nonaqueous electrolyte secondary battery falls into an overcharged state.

As a result, the pressure in a battery case rises immediately, thereby enabling the pressure-sensitive safety system to operate in a short time.

Japanese Published Unexamined Patent Application Nos. 2011-150873 and 10-154532 (Patent Documents 1 and 2) propose a technique in which a positive electrode active material mix layer is allowed to contain lithium phosphate as a method for increasing the reliability of a nonaqueous electrolyte secondary battery in an overcharged state.

BRIEF SUMMARY OF THE INVENTION

Nonaqueous electrolyte secondary batteries used in power supplies for driving hybrid electric vehicles (PHEVs and HEVs) and electric vehicles (EVs) and the like are required to have further increased reliability.

It is an object of the present invention to increase the reliability of a nonaqueous electrolyte secondary battery in an overcharged state.

A nonaqueous electrolyte secondary battery according to an embodiment of the present invention includes an electrode assembly including a negative plate and a positive plate including a positive electrode active material mix layer containing a positive electrode active material, a nonaqueous electrolyte, a battery case that houses the electrode assembly and the nonaqueous electrolyte, and a pressure-sensitive safety system that operates when the pressure in the battery case reaches a value greater than or equal to a predetermined value.

The nonaqueous electrolyte contains an electrolyte salt containing fluorine.

The positive electrode active material mix layer contains lithium carbonate and lithium phosphate.

The average particle size of lithium carbonate contained in the positive electrode active material mix layer is greater than the average particle size of lithium phosphate contained in the positive electrode active material mix layer.

The number of particles of lithium carbonate contained in the positive electrode active material mix layer is less than the number of particles of lithium phosphate contained in the positive electrode active material mix layer.

The nonaqueous electrolyte secondary battery according to an embodiment of the present invention includes the pressure-sensitive safety system and the positive electrode active material mix layer contains lithium carbonate. Therefore, when the nonaqueous electrolyte secondary battery falls into an overcharged state, the potential of the positive plate rises to decompose lithium carbonate, thereby generating carbon dioxide. The generation of carbon dioxide immediately increases the pressure in the battery case and the pressure-sensitive safety system operates early. Incidentally, the pressure-sensitive safety system is a system for suppressing the progress of overcharge and includes no gas release valve.

When the nonaqueous electrolyte secondary battery falls into an overcharged state, the potential of the positive plate rises and the positive electrode active material reacts with a nonaqueous electrolyte solution containing the electrolyte salt, which contains fluorine, to produce hydrofluoric acid and/or phosphorus pentafluoride. The hydrofluoric acid and/or phosphorus pentafluoride reacts with the nonaqueous electrolyte solution, thereby abnormally increasing the temperature of the nonaqueous electrolyte secondary battery. Therefore, even though the positive electrode active material is allowed to contain lithium carbonate and the pressure-sensitive safety system is started by a carbon dioxide gas generated by the decomposition of lithium carbonate to block a charge current early, the increase in temperature of the nonaqueous electrolyte secondary battery may possibly be incapable of being suppressed.

Therefore, the positive electrode active material is allowed to contain lithium phosphate, whereby hydrofluoric acid and/or phosphorus pentafluoride produced on the surface of the positive electrode active material is trapped by lithium phosphate and the reaction of hydrofluoric acid and/or phosphorus pentafluoride with the nonaqueous electrolyte solution is inhibited. This enables the increase in temperature of the nonaqueous electrolyte secondary battery to be suppressed.

In order to develop nonaqueous electrolyte secondary batteries with higher reliability, the inventor has intensively investigated a phenomenon that occurs in a nonaqueous electrolyte secondary battery when the nonaqueous electrolyte secondary battery falls into an overcharged state. As a result, the inventor has found that a problem below is present when the nonaqueous electrolyte secondary battery falls into an overcharged state under more severe conditions.

Lithium carbonate traps hydrofluoric acid and/or phosphorus pentafluoride, produced on the surface of a positive electrode active material, moving in a nonaqueous electrolyte solution. Herein, when a carbon dioxide gas is generated by the decomposition of lithium carbonate, the nonaqueous electrolyte solution in a portion in which the carbon dioxide gas is generated is driven away to another portion by the pressure of the generated carbon dioxide gas. Surroundings of a location where lithium carbonate has been present fall into such a state that the nonaqueous electrolyte solution is not present or is present in a smaller amount as compared to other surroundings. Therefore, when a large number of lithium carbonate particles with a small size are dispersively present in a positive electrode active material mix layer, a large amount of gas is generated in many locations in the positive electrode active material mix layer and may possibly inhibit lithium phosphate from trapping hydrofluoric acid and/or phosphorus pentafluoride moving in the nonaqueous electrolyte solution.

Furthermore, the inventor has found that a pressure-sensitive safety system can be operated without any problem even when the size of particles of lithium carbonate contained in the positive electrode active material mix layer is large and the number of the lithium carbonate particles is small.

The present invention has been made on the basis of these findings and is characterized in that the average particle size of lithium carbonate contained in a positive electrode active material is set to be greater than the average particle size of lithium phosphate and the number of lithium carbonate particles contained in the positive electrode active material mix layer is set to be less than the number of lithium phosphate particles. In this configuration, when a nonaqueous electrolyte secondary battery falls into an overcharged state, a pressure-sensitive safety system can be immediately started using gas generated by the decomposition of lithium carbonate. Furthermore, the fact that a nonaqueous electrolyte solution is driven off by gas generated by the decomposition of lithium carbonate and lithium phosphate is unlikely to trap hydrofluoric acid and/or phosphorus pentafluoride can be effectively suppressed as compared to the case where a larger amount of lithium carbonate with a small particle size is present in a positive electrode active material mix layer. Thus, lithium phosphate can effectively trap hydrofluoric acid and/or phosphorus pentafluoride. Accordingly, the nonaqueous electrolyte secondary battery has higher reliability.

The average particle size of the lithium carbonate is preferably 1.5 times to 5 times the average particle size of the lithium phosphate.

The ratio of the number of the lithium carbonate particles contained in the positive electrode active material mix layer to the number of the lithium phosphate particles contained in the positive electrode active material mix layer is preferable 0.5 or less.

It is preferable that the average particle size of the lithium carbonate is 2.0 µm to 10.0 µm and the average particle size of the lithium phosphate is 1.0 µm to 5.0 µm.

The lithium carbonate particles are preferably flat in shape.

The ratio of the longitudinal length to lateral length of each of the lithium carbonate particles is preferably from 1.2 to 5 and more preferably 2 to 5.

The average distance between the neighboring lithium carbonate particles and lithium phosphate particles in the positive electrode active material mix layer is preferably 4 µm to 20 µm.

The present invention provides a nonaqueous electrolyte secondary battery with higher reliability.

DETAILED DESCRIPTION OF THE INVENTION

Embodiments of the present invention are described below in detail. The embodiments, which are described below, are exemplifications of the present invention. The present invention is not limited to the embodiments.

Figure 1:
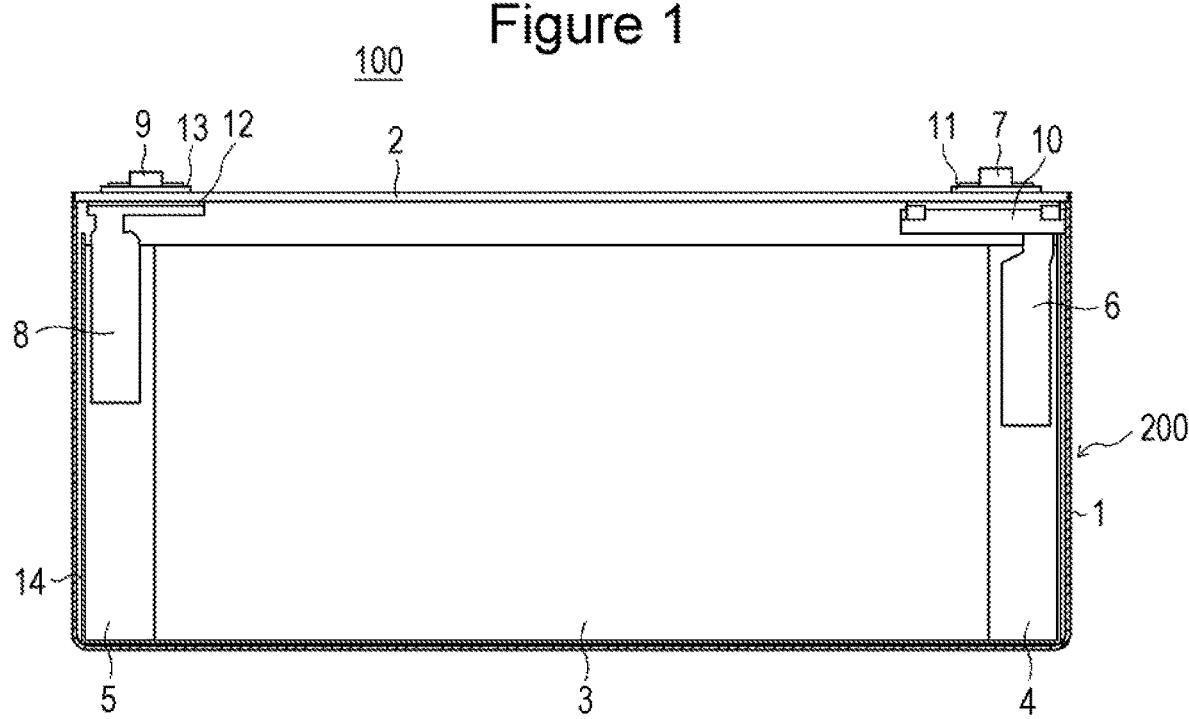
FIG. 1 is a schematic front view showing the inside of a nonaqueous electrolyte secondary battery according to an embodiment of the present invention except a front portion of a battery case and a front portion of an insulating sheet.
Figure 2:
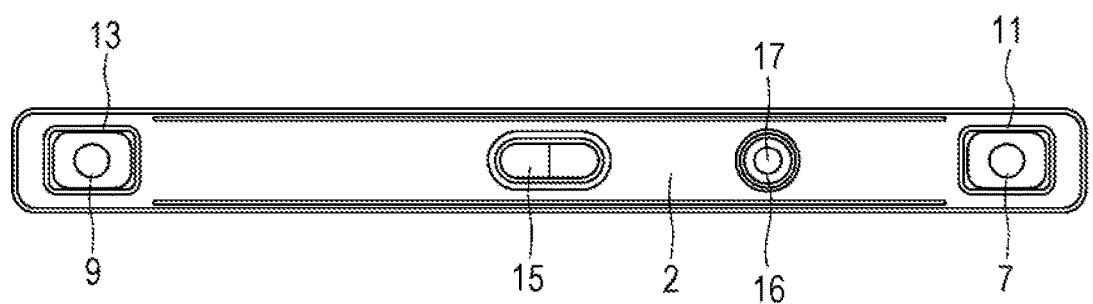
FIG. 2 is a top view of the nonaqueous electrolyte secondary battery shown in FIG. 1.

The configuration of a prismatic nonaqueous electrolyte secondary battery 100 according to an embodiment of the present invention is described with reference to FIGS. 1 and 2. As shown in FIGS. 1 and 2, the prismatic nonaqueous electrolyte secondary battery 100 includes an enclosure 1 which has an opening and which has a prismatic bottomed cylindrical shape and a sealing plate 2 for sealing the opening of the enclosure 1. The enclosure 1 and the sealing plate 2 form a battery case 200. The battery case 200 houses a flat wound electrode assembly 3 formed by winding a strip-like positive plate 40 and a strip-like negative plate with a strip-like separator therebetween and also houses a nonaqueous electrolyte solution. The wound electrode assembly 3 includes positive core-exposed portions 4 wound around one end portion thereof and negative core-exposed portions 5 wound around the other end portion.

The positive core-exposed portions 4 are connected to a positive electrode current collector 6. The positive electrode current collector 6 is electrically connected to a positive electrode terminal 7. An outer insulating member 11 is placed between the positive electrode terminal 7 and the sealing plate 2. A current-blocking system 10 is placed between the positive electrode current collector 6 and the positive electrode terminal 7. The current-blocking system 10 operates when the pressure in the battery case 200 reaches a value greater than or equal to a predetermined value, thereby breaking a conductive path between the positive plate 40 and the positive electrode terminal 7.

The negative core-exposed portions 5 are connected to a negative electrode current collector 8. The negative electrode current collector 8 is electrically connected to a negative electrode terminal 9. An inner insulating member 12 made of resin is placed between the negative electrode current collector 8 and the sealing plate 2. An outer insulating member 13 made of resin is placed between the negative electrode terminal 9 and the sealing plate 2.

An insulating sheet 14 made of resin is placed between the wound electrode assembly 3 and the enclosure 1. The sealing plate 2 is provided with a gas release valve 15 that ruptures to release gas in the battery case 200 to the outside of the battery case 200 when the pressure in the battery case 200 reaches a value greater than or equal to a predetermined value. Furthermore, the sealing plate 2 is provided with an electrolyte solution-pouring hole 16. The electrolyte solution-pouring hole 16 is sealed with a sealing plug 17 after the nonaqueous electrolyte solution is poured into the battery case 200. The operating pressure of the gas release valve 15 is higher than the operating pressure of the current-blocking system 10.

Figure 3:
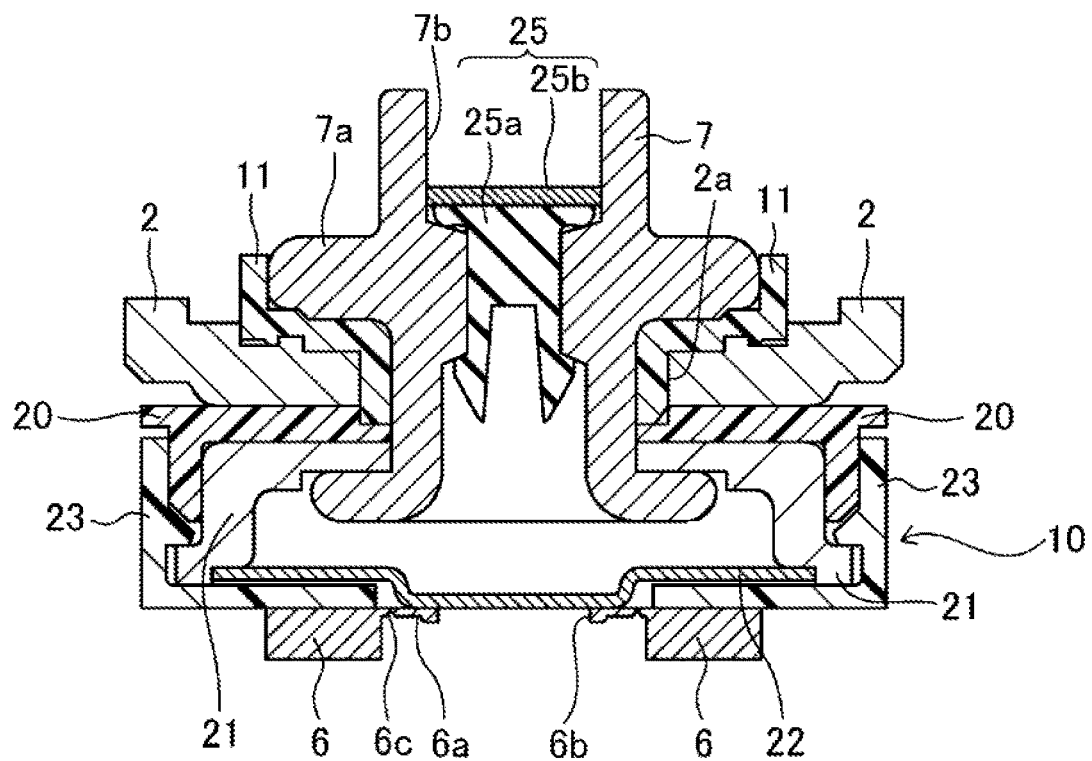
FIG. 3 is a sectional view of the vicinity of a current-blocking system taken in a lateral direction of a sealing plate.

FIG. 3 is a sectional view of the vicinity of the current-blocking system 10 taken in a lateral direction of the sealing plate 2. A conductive member 21 is placed above the inside surface of the sealing plate 2 with a first insulating member 20, made of resin, therebetween. The conductive member 21 is made of metal and has an opening located on the wound electrode assembly 3 side. The opening of the conductive member 21 is sealed with a deformable plate 22 made of metal. The deformable plate 22 is connected to the positive electrode current collector 6. A second insulating member 23 made of resin is placed between the deformable plate 22 and the positive electrode current collector 6. The second insulating member 23 is connected to the first insulating member 20 by fitting. Furthermore, the second insulating member 23 is connected to the positive electrode current collector 6 by fitting.

The positive electrode current collector 6 is provided with a thin portion 6a. The thin portion 6a has a connection opening 6b formed at the center thereof. A peripheral portion of the connection opening 6b is welded to the deformable plate 22. The thin portion 6a is provided with a notch portion 6c which is ring-shaped.

When the nonaqueous electrolyte secondary battery 100 falls into an overcharged state and the pressure in the battery case 200 rises, a central portion of the deformable plate 22 deforms toward the sealing plate 2. The notch portion 6c serves as a fracture-planned portion provided in the positive electrode current collector 6 and is fractured by the deformation of the deformable plate 22. This breaks the conductive path between the positive plate 40 and the positive electrode terminal 7.

A method for manufacturing the nonaqueous electrolyte secondary battery 100 is described below.

Preparation of Positive Plate

A positive electrode active material which is a lithium-transition metal composite oxide represented by the formula $LiNi_{0.35}Co_{0.35}Mn_{0.30}O_2$, a conductive agent which is a carbon powder, lithium carbonate, lithium phosphate, and a binding agent which is polyvinylidene fluoride (PVdF) are mixed with a dispersion medium which is N-methyl-2-pyrrolidone (NMP), whereby positive electrode mix slurry is prepared. The mass ratio of the positive electrode active material to lithium carbonate to lithium phosphate to the conductive agent to the binding agent in the positive electrode mix slurry is 88:2:1:7:2. The lithium-transition metal composite oxide has an average particle size of 3.0 µm.

The positive electrode mix slurry prepared by the above method is applied to both surfaces of aluminium foil, serving as a positive core, having a thickness of 15 µm using a die coater. Thereafter, the positive electrode mix slurry is dried, whereby the dispersion medium, which is NMP, is removed. Positive electrode active material mix layers 40b thereby formed are compressed using a pair of compression rollers. In this operation, the positive electrode active material mix layers 40b are compressed such that the compressed positive electrode active material mix layers 40b have a packing density of 2.5 g/cm³. The aluminium foil provided with the positive electrode active material mix layers 40b is cut to a predetermined size such that the positive core-exposed portions 4 are located on both surfaces of a lateral end portion of the aluminium foil along a longitudinal direction and are not covered by the positive electrode active material mix layers 40b, whereby the positive plate 40 is prepared.

Figure 4:
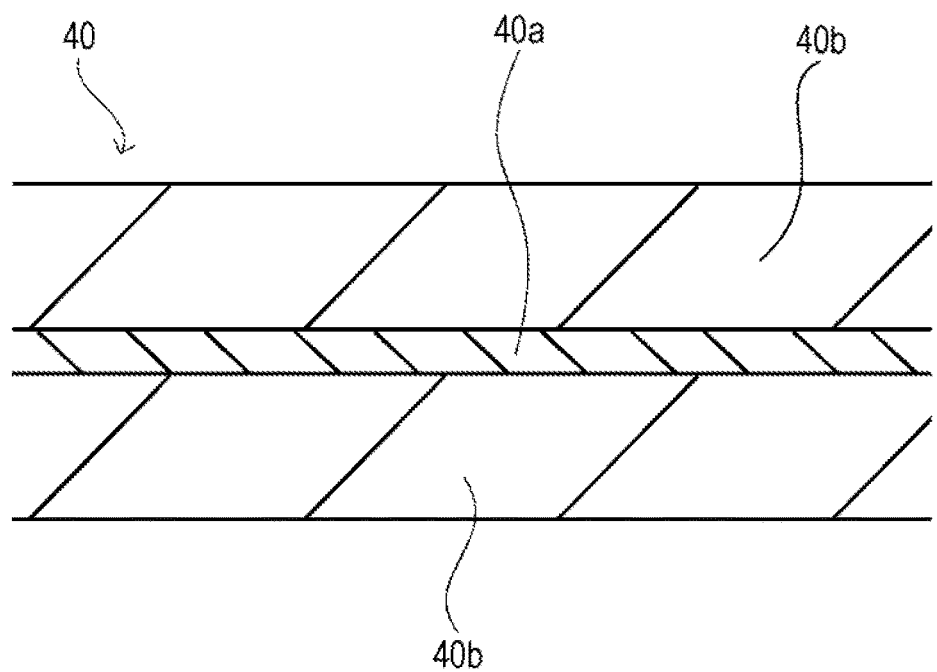
FIG. 4 is a sectional view of a positive plate.
Figure 5:
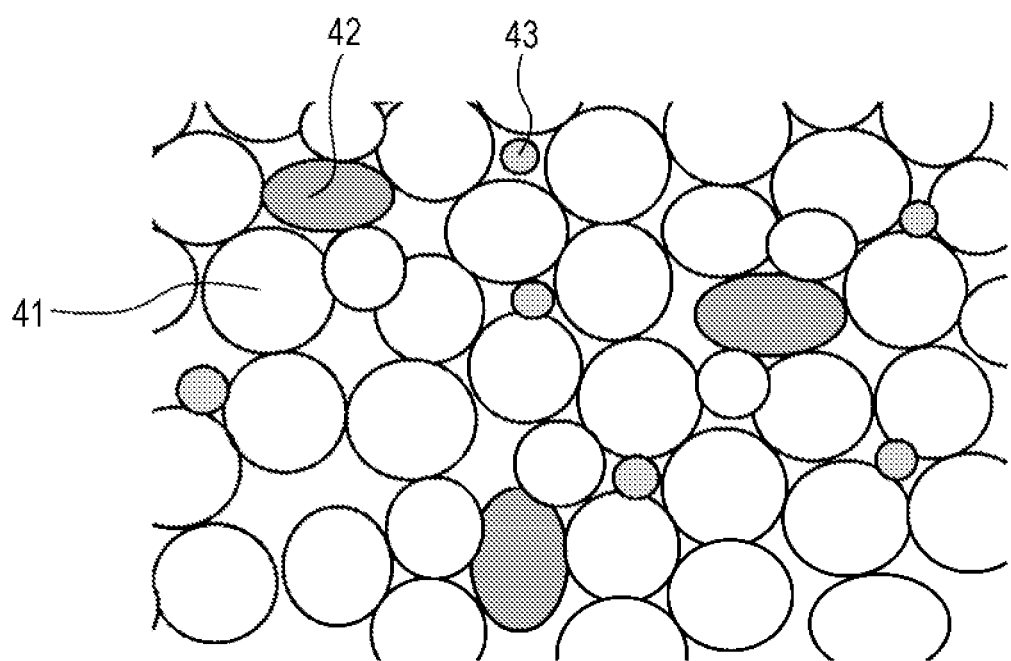
FIG. 5 is an enlarged sectional view of a positive electrode active material mix layer.

FIG. 4 is a sectional view of the positive plate 40. The positive plate 40 includes a positive core 40a made of aluminium foil and the positive electrode active material mix layers 40b. The positive electrode active material mix layers 40b are placed on both surfaces of the positive core 40a. FIG. 5 is an enlarged sectional view of one of the positive electrode active material mix layers 40b and schematically shows the state of particles 41 of the positive electrode active material, particles 42 of lithium carbonate, and particles 43 of lithium phosphate in the positive electrode active material mix layers 40b. In FIG. 5, the conductive agent and the binding agent are not shown. As shown in FIG. 5, the lithium carbonate particles 42 and the lithium phosphate particles 43 are placed between the positive electrode active material particles 41.

Preparation of Negative Plate

A negative electrode active material which is a graphite powder, a thickening agent which is carboxymethylcellulose (CMC), and a binding agent which is styrene-butadiene rubber (SBR) are dispersed in water at a mass ratio of 98:1:1, whereby negative electrode mix slurry is prepared.

The negative electrode mix slurry prepared by the above method is applied to both surfaces of copper foil serving as a negative core using a die coater. Next, the positive electrode mix slurry is dried, whereby a dispersion medium, that is, water is removed. Negative electrode active material mix layers thereby formed are compressed with a roll press so as to have a predetermined thickness. The copper foil provided with the negative electrode active material mix layers is cut to a predetermined size such that the negative core-exposed portions 5 are located on both surfaces of a lateral end portion of the copper foil along a longitudinal direction and are not covered by the negative electrode active material mix layers, whereby the negative plate is prepared.

Preparation of Flat Electrode Assembly

The flat wound electrode assembly 3 is prepared in such a manner that the positive plate 40 and negative plate prepared by the above methods are wound with the separator therebetween and are then press-formed so as to be flat. The separator is 20 µm thick and is made of polypropylene. In this operation, the positive core-exposed portions 4 are wound around one end portion of the flat wound electrode assembly 3 in a winding axis direction thereof and the negative core-exposed portions 5 are wound around the other end portion.

Preparation of Nonaqueous Electrolyte Solution

Ethylene carbonate (EC), ethyl methyl carbonate (EMC), and diethyl carbonate (DEC) are mixed at a volume ratio of 3:3:4 at 25° C. and 1 atm, whereby a solvent mixture is prepared. To the solvent mixture, 1 mol/L of $LiPF_6$ which is a solute is added, whereby the nonaqueous electrolyte solution is prepared.

Attachment of Terminals and Current Collectors to Sealing Plate

The outer insulating member 11 is provided on a battery outside surface around a positive electrode terminal-mounting hole 2a in the sealing plate 2. The first insulating member 20 and the conductive member 21 are provided on a battery inside surface around the positive electrode terminal-mounting hole 2a in the sealing plate 2. Thereafter, the positive electrode terminal 7 is inserted into a through-hole in the outer insulating member 11, the positive electrode terminal-mounting hole 2a in the sealing plate 2, a through-hole in the first insulating member 20, and a through-hole in the conductive member 21 from the outside. The tip side of the positive electrode terminal 7 is swaged on the conductive member 21. Thereafter, a swaged portion of the positive electrode terminal 7 is welded to the conductive member 21. A flange portion 7a of the positive electrode terminal 7 is placed outside the sealing plate 2. Next, the deformable plate 22 is welded to a peripheral portion of in an opening in the conductive member 21, the opening being located on the wound electrode assembly 3 side. This allows the opening located on the wound electrode assembly 3 side to be hermetically sealed.

Next, a protrusion, which is not shown, attached to the second insulating member 23 is inserted into an opening in the positive electrode current collector 6 and a tip portion of the protrusion attached to the second insulating member 23 is increased in diameter. This allows the second insulating member 23 to be fixed to the positive electrode current collector 6. Thereafter, the second insulating member 23 fixed to the positive electrode current collector 6 is connected to the first insulating member 20.

The deformable plate 22 is welded to the positive electrode current collector 6 in such a state that gas is fed into the conductive member 21 from the outside through a terminal through-hole 7b in the positive electrode terminal 7 and the deformable plate 22 is in contact with the positive electrode current collector 6. A leakage check is preferably carried out by feeding gas. Thereafter, the terminal through-hole 7b in the positive electrode terminal 7 is sealed with a terminal plug 25. The terminal plug 25 preferably includes a rubber member 25a and a metal plate 25b.

Attachment of Negative Electrode Terminal to Sealing Plate

The outer insulating member 13 is provided on a battery outside surface around a negative electrode terminal-mounting hole in the sealing plate 2. The inner insulating member 12 and the negative electrode current collector 8 are provided on a battery inside surface around the negative electrode terminal-mounting hole in the sealing plate 2. Thereafter, the negative electrode terminal 9 is inserted into a through-hole in the outer insulating member 13, the negative electrode terminal-mounting hole in the sealing plate 2, a through-hole in the inner insulating member 12, and a through-hole in the negative electrode current collector 8 from the outside. The tip side of the negative electrode terminal 9 is swaged on the negative electrode current collector 8. Thereafter, a swaged portion of the negative electrode terminal 9 is welded to the negative electrode current collector 8.

Connection of Current Collectors to Electrode Assembly

The positive electrode current collector 6 is welded to the wound positive core-exposed portions 4 of the wound electrode assembly 3. The negative electrode current collector 8 is welded to the wound negative core-exposed portions 5 of the wound electrode assembly 3. Welding used may be resistance welding, ultrasonic welding, laser welding, or the like.

Insertion of Electrode Assembly into Enclosure

The wound electrode assembly 3 is wrapped in the insulating sheet 14 and is then inserted into the enclosure 1. Thereafter, the enclosure 1 and the sealing plate 2 are welded to each other such that the opening of the enclosure 1 is sealed with the sealing plate 2.

Pouring and Sealing

The nonaqueous electrolyte solution prepared by the above method is poured into the battery case 200 through the electrolyte solution-pouring hole 16 in the sealing plate 2, followed by sealing the electrolyte solution-pouring hole 16 with the sealing plug 17, which is a blind rivet. The nonaqueous electrolyte secondary battery 100 is prepared as described above.

Example 1

Nonaqueous electrolyte secondary batteries were prepared by the above-mentioned method using lithium carbonate with an average particle size of 4.9 μm and lithium phosphate with an average particle size of 2.7 μm.

Example 2

Nonaqueous electrolyte secondary batteries were prepared by the above-mentioned method using lithium carbonate with an average particle size of 5.7 μm and lithium phosphate with an average particle size of 1.4 μm.

Comparative Example 1

Nonaqueous electrolyte secondary batteries were prepared by the above-mentioned method using lithium carbonate with an average particle size of 4.9 μm without using lithium phosphate.

Comparative Example 2

Nonaqueous electrolyte secondary batteries were prepared by the above-mentioned method using lithium phosphate with an average particle size of 2.7 μm without using lithium carbonate.

Comparative Example 3

Nonaqueous electrolyte secondary batteries were prepared by the above-mentioned method using lithium carbonate with an average particle size of 4.9 μm and lithium phosphate with an average particle size of 6.0 μm.

The average particle size of lithium carbonate and the average particle size of lithium phosphate were determined in such a manner that particles of each of lithium carbonate and lithium phosphate were observed with a scanning electron microscope (SEM) and 20 of the particles were measured for size, followed by averaging. For each particle, the maximum size was measured.

The nonaqueous electrolyte secondary batteries prepared in Examples 1 and 2 and Comparative Examples 1 to 3 had a capacity of 4 Ah.

The nonaqueous electrolyte secondary batteries prepared in Examples 1 and 2 and Comparative Examples 1 to 3 were subjected to an overcharge test below.

Overcharge Test (1) Each nonaqueous electrolyte secondary battery was charged to 4.1 V with a current of 4 A under 25° C. conditions.

(2) Next, the nonaqueous electrolyte secondary battery was charged with a constant current of 130 A under 60° C. conditions.

Incidentally, 130 A is high-rate charge corresponding to 32.5 C and the 60° C. conditions are high-temperature conditions; hence, conditions for the overcharge test are very severe conditions.

Evaluation

Three of the nonaqueous electrolyte secondary batteries prepared in each of Examples 1 and 2 and Comparative Examples 1 to 3 were subjected to the above overcharge test.

The case where all of three tested nonaqueous electrolyte secondary batteries fumed within 5 minutes after the start of a current-blocking system was rated "poor".

The case where one or two of three tested nonaqueous electrolyte secondary batteries fumed within 5 minutes after the start of a current-blocking system was rated "adequate".

The case where none of three tested nonaqueous electrolyte secondary batteries fumed after the start of a current-blocking system was rated "good".

Ratio of Number of Lithium Carbonate Particles to Number of Lithium Phosphate Particles in Positive Electrode Active Material Mix Layer After a positive plate was cut using a cross-section polisher (CP), a cross section of a positive electrode active material mix layer was observed with a scanning electron microscope (SEM). The number of particles of lithium carbonate and the number of particles of lithium phosphate present in an area of 20 µm×50 µm were measured. This allowed the ratio of the number of the lithium carbonate particles to the number of the lithium phosphate particles in the positive electrode active material mix layer to be determined.

Table 1 shows results obtained by evaluating the nonaqueous electrolyte secondary batteries by the overcharge test. Furthermore, Table 1 shows the average particle size (µm) of lithium carbonate, the average particle size (µm) of lithium phosphate, (the average particle size of lithium carbonate)/(the average particle size of lithium phosphate), and (the number of the lithium carbonate particles)/(the number of the lithium phosphate particles) in each nonaqueous electrolyte secondary battery.

However, in Comparative Example 1, in which no lithium phosphate was contained, and Comparative Example 2, in which no lithium carbonate was contained, fuming occurred in the overcharge test within 5 minutes after the start of a current-blocking system in some cases. It is conceivable that in Comparative Example 1, in which no lithium phosphate was contained, the increase in temperature of each nonaqueous electrolyte secondary battery cannot be suppressed and therefore fuming occurs, though carbon dioxide is generated by the decomposition of lithium carbonate and a current-blocking system can be immediately started. Furthermore, it is conceivable that in Comparative Example 2, in which no lithium carbonate was contained, the start of a current-blocking system is slow and therefore fuming occurs.

In Comparative Example 3, in which the average particle size of lithium carbonate was less than the average particle size of lithium phosphate and the number of the lithium carbonate particles was greater than the number of the lithium phosphate particles, fuming occurred in the overcharge test within 5 minutes after the start of a current-blocking system in some cases. It is conceivable that when the average particle size of lithium carbonate is less than the average particle size of lithium phosphate and the number of particles of lithium carbonate is greater than the number of particles of lithium phosphate, carbon dioxide generated by the decomposition of lithium carbonate inhibits lithium phosphate from trapping hydrofluoric acid and/or phosphorus pentafluoride in a nonaqueous electrolyte solution. As a result, it is conceivable that the reaction of hydrofluoric acid and/or phosphorus pentafluoride with the nonaqueous electrolyte solution is not inhibited, the increase in temperature of each nonaqueous electrolyte secondary battery is not suppressed, and therefore fuming occurs.

As described above, the fact that the average particle size of lithium carbonate is greater than the average particle size of lithium phosphate and the number of lithium carbonate particles is less than the number of lithium phosphate particles in a positive electrode active material mix layer enables a pressure-sensitive current-blocking system to be

TABLE 1

|  | Average particle size of lithium carbonate (µm) | Average particle size of lithium phosphate (µm) | (Average particle size of lithium carbonate)/ (average particle size of lithium phosphate) | (Number of particles of lithium carbonate)/ (number of particles of lithium phosphate) | Evaluation results of overcharge test |
|---|---|---|---|---|---|
| Example 1 | 4.9 | 2.7 | 1.81 | 0.4 | Good |
| Example 2 | 5.7 | 1.4 | 4.07 | 0.4 | Good |
| Comparative Example 1 | 4.9 | — | — | — | Poor |
| Comparative Example 2 | — | 2.7 | — | — | Poor |
| Comparative Example 3 | 4.9 | 6.0 | 0.82 | 1.2 | Poor |

In Examples 1 and 2, in which the average particle size of lithium carbonate was greater than the average particle size of lithium phosphate and the number of the lithium carbonate particles was less than the number of the lithium phosphate particles in each positive electrode active material mix layer, fuming did not occur in the overcharge test. It is conceivable that in the configuration of each of Examples 1 and 2, a current-blocking system can be immediately started and hydrofluoric acid and/or phosphorus pentafluoride can be effectively trapped by lithium phosphate.

immediately started by the generation of a carbon dioxide gas and provides a nonaqueous electrolyte secondary battery in which the effect of trapping hydrofluoric acid and/or phosphorus pentafluoride by lithium phosphate is not inhibited and which has excellent reliability.

The average particle size of lithium carbonate is preferably 1.5 times to 5 times the average particle size of lithium phosphate and more preferably 2 times to 4 times. This allows an effect of the present invention to be more effectively obtained.

The ratio of the number of particles of lithium carbonate contained in a positive electrode active material mix layer to the number of particles of lithium phosphate contained in the positive electrode active material mix layer is preferably 0.5 or less and more preferably 0.4 or less. This enables a larger number of the lithium phosphate particles to be dispersed in the positive electrode active material mix layer. Thus, hydrofluoric acid and/or phosphorus pentafluoride can be more effectively trapped by lithium phosphate.

The average particle size of lithium carbonate is preferably 2.0 µm to 10.0 µm, more preferably 3.0 µm to 9.0 µm, and further more preferably 4.0 µm to 8.0 µm. When the average particle size of lithium carbonate is within this range, lithium carbonate is likely to be decomposed and a pressure-sensitive safety system can be more reliably and immediately started when a nonaqueous electrolyte secondary battery falls into an overcharged state.

The average particle size of lithium phosphate is preferably 1.0 µm to 5.0 µm and more preferably 1.0 µm to 4.0 µm. When the average particle size of lithium phosphate is within this range, hydrofluoric acid and/or phosphorus pentafluoride can be more effectively trapped by lithium phosphate.

The lithium carbonate particles are preferably flat in shape. The ratio of the longitudinal length to lateral length of each lithium carbonate particle is preferably from 1.2 to 5 and more preferably 2 to 5. When the lithium carbonate particles are flat in shape, the lithium carbonate particles can be inhibited from entering a positive core in the course of compressing the positive electrode active material mix layer. Thus, a carbon dioxide gas generated in the positive electrode active material mix layer by the decomposition of lithium carbonate is likely to be released outside the positive electrode active material mix layer. Avoiding that the lithium carbonate particles are extremely flat enables a nonaqueous electrolyte solution around the lithium carbonate particles to be more effectively inhibited from being driven off by the local generation of a large amount of the carbon dioxide gas. Thus, hydrofluoric acid and/or phosphorus pentafluoride can be more effectively trapped by lithium phosphate.

The average distance between the neighboring lithium carbonate particles and lithium phosphate particles in the positive electrode active material mix layer is preferably 4 µm to 20 µm. This enables the carbon dioxide gas generated by the decomposition of lithium carbonate to be more reliably inhibited from preventing lithium phosphate from trapping hydrofluoric acid and/or phosphorus pentafluoride.

Short-Circuiting System

A short-circuiting system which is pressure-sensitive can be used as a safety system instead of a current-blocking system. The short-circuiting system operates when the pressure in a battery case reaches a value greater than or equal to a predetermined value by overcharge or the like. The short-circuiting system operates to electrically short-circuit a positive plate and a negative plate outside a wound electrode assembly. This prevents the further progress of overcharge. Incidentally, a fuse portion fused by a short-circuit current is preferably attached to a positive electrode current collector or the like.

Figure 6A:
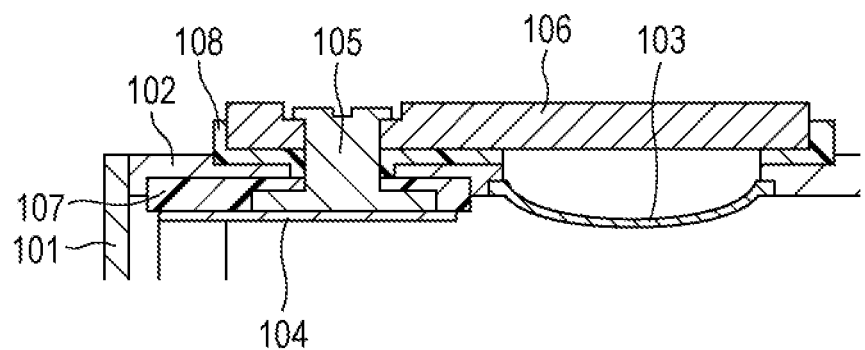
FIG. 6A is a sectional view of the vicinity of a negative electrode terminal taken in a longitudinal direction of a sealing plate.
Figure 6B:
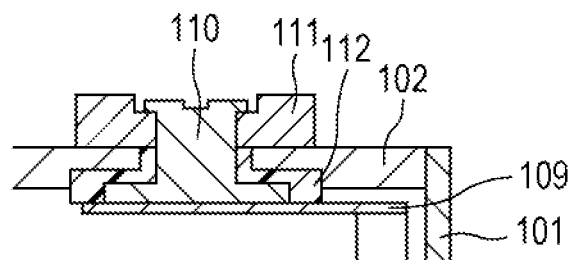
FIG. 6B is a sectional view of the vicinity of a positive electrode terminal taken in a longitudinal direction of the sealing plate.

The configuration of the short-circuiting system is described using FIGS. 6A and 6B. FIG. 6A is a sectional view of the vicinity of a negative electrode terminal 105 taken in a longitudinal direction of a sealing plate 102. The sealing plate 102 seals an opening in an enclosure 101 and is provided with a deformable portion 103. A negative electrode outside conductive member 106 electrically connected to the negative electrode terminal 105 is placed outside the deformable portion 103. A negative electrode current collector 104 connected to a negative plate is connected to the negative electrode terminal 105. The negative electrode terminal 105 extends through a through-hole in an inner insulating member 107, a through-hole in the sealing plate 102, a through-hole in an outer insulating member 108, and a through-hole in the negative electrode outside conductive member 106. The tip side of the negative electrode terminal 105 is swaged on the negative electrode outside conductive member 106.

FIG. 6B is a sectional view of the vicinity of a positive electrode terminal 110 taken in a longitudinal direction of the sealing plate 102. As shown in FIG. 6B, a positive electrode current collector 109 connected to a positive plate is connected to the positive electrode terminal 110. The positive electrode terminal 110 is connected to a positive electrode outside conductive member 111. The positive plate is connected to the sealing plate 102 through the positive electrode current collector 109, the positive electrode terminal 110, and the positive electrode outside conductive member 111. Incidentally, a conductive member may be placed between the positive electrode outside conductive member 111 and the sealing plate 102. An inner insulating member 112 is placed between the sealing plate 102 and the positive electrode terminal 110.

When a nonaqueous electrolyte secondary battery falls into an overcharged state, the pressure in a battery case rises, a central portion of the deformable portion 103 deforms toward the negative electrode outside conductive member 106, whereby the deformable portion 103 is electrically connected to the negative electrode outside conductive member 106. Therefore, the positive plate and the negative plate are electrically shorted through the sealing plate 102 and the deformable portion 103. This enables a charge current to be inhibited from flowing into a wound electrode assembly 3. Thus, the progress of overcharge can be suppressed. It is more preferable that a fuse portion attached to the positive electrode current collector 109 or the like is fused when a charge current flows through the nonaqueous electrolyte secondary battery, because the progress of overcharge can be suppressed. The pressure at which the short-circuiting system operates is set to a value lower than the pressure at which a gas release valve operates.

Others

While the wound electrode assembly has been exemplified in the above embodiment, a stacked electrode assembly can be used.

The amount of lithium carbonate contained in a positive electrode active material mix layer is preferably 0.5% by mass to 5% by mass of the amount of the positive electrode active material mix layer and more preferably 1.0% by mass to 4.0% by mass.

The amount of lithium phosphate contained in the positive electrode active material mix layer is preferably 0.5% by mass to 5% by mass of the amount of the positive electrode active material mix layer and more preferably 1.0% by mass to 4.0% by mass.

A positive electrode active material used is preferably a lithium-transition metal composite oxide. Examples of the lithium-transition metal composite oxide include lithium cobaltate ($LiCoO_2$), lithium manganate ($LiMn_2O_4$), lithium nickelate ($LiNiO_2$), a lithium-nickel-manganese composite oxide ($LiNi_{1-x}Mn_xO_2$, where $0<x<1$), a lithium-nickel-cobalt composite oxide ($LiNi_{1-x}Co_xO_2$, where $0<x<1$), and a lithium-nickel-cobalt-manganese composite oxide ($LiNi_xCo_yMn_zO_2$, where $0<x<1$, $0<y<1$, $0<z<1$, and $x+y+z=1$).

One obtained by adding Al, Ti, Zr, Nb, B, W, Mg, Mo, or the like to the lithium-transition metal composite oxide can be used. For example, the following oxide is cited: a lithium-transition metal composite oxide represented by the formula $Li_{1+a}Ni_xCo_yMn_zM_bO_2$, where M is at least one selected from the group consisting of Al, Ti, Zr, Nb, B, Mg, and Mo; $0 \le a \le 0.2$; $0.2 \le x \le 0.5$; $0.2 \le y \le 0.5$; $0.2 \le z \le 0.4$; $0 \le b \le 0.02$; and $a+b+x+y+z=1$.

A negative electrode active material used may be a carbon material capable of storing and releasing lithium ions. Examples of the carbon material capable of storing and releasing lithium ions include graphite, non-graphitizable carbon, graphitizable carbon, fibrous carbon, coke, and carbon black. Among these materials, graphite is particularly preferable. Furthermore, examples of a non-carbonaceous material include silicon, tin, alloys mainly containing silicon and/or tin, oxides mainly containing silicon and/or tin.

As a nonaqueous solvent (organic solvent) in a nonaqueous electrolyte, carbonates, lactones, ethers, ketones, esters, and the like can be used and mixtures of two or more of these solvents can also be used. For example, the following carbonates can be used: cyclic carbonates such as ethylene carbonate, propylene carbonate, and butylene carbonate and linear carbonates such as dimethyl carbonate, ethyl methyl carbonate, and diethyl carbonate. In particular, a solvent mixture of a cyclic carbonate and a linear carbonate is preferably used. An unsaturated cyclic carbonate such as vinylene carbonate (VC) may be added to the nonaqueous electrolyte.

As an electrolyte salt in the nonaqueous electrolyte, those used as electrolyte salts in conventional lithium ion secondary batteries can be used. For example, the following salts and mixtures can be used: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, and $LiP(C_2O_4)F_4$ and mixtures of these salts. Among these salts, $LiPF_6$ is particularly preferable. The amount of the electrolyte salt dissolved in the nonaqueous solvent is preferably 0.5 mol/L to 2.0 mol/L.

A separator used is preferably a microporous separator made of a polyolefin such as polypropylene (PP) or polyethylene (PE). In particular, a separator having a three-layer structure (PP/PE/PP or PE/PP/PE) composed of polypropylene (PP) and polyethylene (PE) is preferably used. The separator may include a heat-resistant layer composed of inorganic particles such as alumina particles and a binder. Alternatively, a polymer electrolyte may be used as a separator.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
   an electrode assembly including a negative plate and a positive plate including a positive electrode active material mix layer containing a positive electrode active material;
   a nonaqueous electrolyte;
   a battery case that houses the electrode assembly and the nonaqueous electrolyte; and
   a pressure-sensitive safety system that operates when the pressure in the battery case reaches a value greater than or equal to a predetermined value,
   wherein the nonaqueous electrolyte contains an electrolyte salt containing fluorine, the positive electrode active material mix layer contains lithium carbonate and lithium phosphate, the average particle size of lithium carbonate contained in the positive electrode active material mix layer is greater than the average particle size of lithium phosphate contained in the positive electrode active material mix layer, and the number of particles of lithium carbonate contained in the positive electrode active material mix layer is less than the number of particles of lithium phosphate contained in the positive electrode active material mix layer, and
   wherein the lithium carbonate particles are flat in shape and the ratio of the longitudinal length to lateral length of each of the lithium carbonate particles is from 1.2 to 5.

2. The nonaqueous electrolyte secondary battery according to claim 1, wherein the average particle size of the lithium carbonate is 1.5 times to 5 times the average particle size of the lithium phosphate.

3. The nonaqueous electrolyte secondary battery according to claim 1, wherein the ratio of the number of the lithium carbonate particles contained in the positive electrode active material mix layer to the number of the lithium phosphate particles contained in the positive electrode active material mix layer is 0.5 or less.

4. The nonaqueous electrolyte secondary battery according to claim 1, wherein the average particle size of the lithium carbonate is 2.0 μm to 10.0 μm and the average particle size of the lithium phosphate is 1.0 μm to 5.0 μm.

5. The nonaqueous electrolyte secondary battery according to claim 1, wherein the average distance between the neighboring lithium carbonate particles and lithium phosphate particles in the positive electrode active material mix layer is 4 μm to 20 μm.

6. The nonaqueous electrolyte secondary battery according to claim 1, wherein the pressure-sensitive safety system is a current-blocking system or a short-circuiting system.

7. A nonaqueous electrolyte secondary battery comprising:
   an electrode assembly including a negative plate and a positive plate including a positive electrode active material mix layer containing a positive electrode active material;
   a nonaqueous electrolyte;
   a battery case that houses the electrode assembly and the nonaqueous electrolyte; and
   a pressure-sensitive safety system that operates when the pressure in the battery case reaches a value greater than or equal to a predetermined value,
   wherein the nonaqueous electrolyte contains an electrolyte salt containing fluorine, the positive electrode active material mix layer contains lithium carbonate and lithium phosphate, the average particle size of lithium carbonate contained in the positive electrode active material mix layer is greater than the average particle size of lithium phosphate contained in the positive electrode active material mix layer, and the number of particles of lithium carbonate contained in the positive electrode active material mix layer is less than the number of particles of lithium phosphate contained in the positive electrode active material mix layer, and wherein the average distance between the neighboring lithium carbonate particles and lithium phosphate particles in the positive electrode active material mix layer is 4 μm to 20 μm.

8. The nonaqueous electrolyte secondary battery according to claim 7, wherein the average particle size of the lithium carbonate is 1.5 times to 5 times the average particle size of the lithium phosphate.

9. The nonaqueous electrolyte secondary battery according to claim 7, wherein the ratio of the number of the lithium carbonate particles contained in the positive electrode active material mix layer to the number of the lithium phosphate particles contained in the positive electrode active material mix layer is 0.5 or less.

10. The nonaqueous electrolyte secondary battery according to claim 7, wherein the average particle size of the lithium carbonate is 2.0 μm to 10.0 μm and the average particle size of the lithium phosphate is 1.0 μm to 5.0 μm.

11. The nonaqueous electrolyte secondary battery according to claim 7, wherein the pressure-sensitive safety system is a current-blocking system or a short-circuiting system.

\* \* \* \* \*